(12) United States Patent
Viaud et al.

(10) Patent No.: US 6,679,041 B2
(45) Date of Patent: Jan. 20, 2004

(54) CROP-FEEDING ROTOR HAVING CENTER SHAFT OF NON-ROUND CROSS-SECTION

(75) Inventors: Jean Viaud, Gray (FR); Alain Beaudoin, Ancier (FR); Aurélien Chabassier, Broy (FR); Lionel Guiet, Gray (FR); Philippe Lucand, Melin (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/175,981

(22) Filed: Jun. 20, 2002

(65) Prior Publication Data

US 2003/0000196 A1 Jan. 2, 2003

(30) Foreign Application Priority Data

Jun. 28, 2001 (DE) .......................... 101 31 239

(51) Int. Cl.[7] .............................................. A01D 39/00
(52) U.S. Cl. ...................... 56/341; 56/16.4 R
(58) Field of Search ............. 56/16.4 R, 341, 56/343, 17.5, 219, 220, DIG. 5, 344, 350, 354

(56) References Cited

U.S. PATENT DOCUMENTS

| | | | | |
|---|---|---|---|---|
| 3,705,328 A | * | 12/1972 | Torok | 315/387 |
| 4,243,104 A | * | 1/1981 | Sipos et al. | 172/148 |
| 4,617,786 A | * | 10/1986 | Fell et al. | 56/13.4 |
| 4,619,106 A | * | 10/1986 | van der Lely | 56/341 |
| 5,848,523 A | * | 12/1998 | Engel et al. | 56/341 |
| 6,279,304 B1 | * | 8/2001 | Anstey et al. | 56/341 |

FOREIGN PATENT DOCUMENTS

| | | |
|---|---|---|
| DE | 3340685 A1 * | 5/1986 |
| DE | A 43 23 214 | 7/1993 |
| DE | U 93 16 378 | 10/1993 |
| DE | A 195 41 561 | 11/1995 |
| DE | 198 06 630 | 8/1999 |
| EP | 0 803 184 | 4/1997 |
| FR | 1 448 451 | 6/1966 |
| GB | 1 458 786 | 12/1976 |
| GB | 2 356 547 | 5/2001 |
| WO | WO A 84/02252 | 6/1984 |

* cited by examiner

Primary Examiner—Robert E. Pezzuto
Assistant Examiner—Nathan Mammen

(57) ABSTRACT

A rotor includes a tube having an outer cross section which is non-circular onto which is assembled one-piece drivers provided with central openings of the same shape and size as the outer circumferential surface of the tube and thereby create a connection, fixed against rotation, between these parts. The rotor is shown used in a crop reducing arrangement of a large round baler.

11 Claims, 4 Drawing Sheets

CROP-FEEDING ROTOR HAVING CENTER SHAFT OF NON-ROUND CROSS-SECTION

FIELD OF THE INVENTION

The invention concerns a rotor with drivers as part of a separating arrangement of an agricultural machine.

BACKGROUND OF THE INVENTION

Cutting arrangements in the take-up region of crop recovery machines are equipped with rotors with attached fingers, that grasp crop and draw it over stationary knives through which it is reduced. Since high forces are applied to the fingers or other drivers particularly upon the entry of foreign objects, a multitude of solutions are proposed in the state of the art according to which the fingers are fastened to the rotor and can be exchanged if they are damaged—see, for example, DE A 195 41 561, DE U 93 16 378, DE A 43 23 214, WO A 84/02252.

The problem underlying the invention is seen in the fact that in each case in which the envelope of a circular cylindrical tube openings is introduced, the drivers are equipped with noses and suspended in the openings and subsequently are welded or bolted together. All these manufacturing operations are costly.

SUMMARY OF THE INVENTION

According to the present invention, there is provided an improved crop-feeding rotor.

An object of the invention is to provide a crop-feeding rotor including a center drive member having a non-circular profile on which is received complementary shaped openings of fingers or other drivers. In this way, the openings and the noses prevalent in the prior art rotors and drivers can be omitted; rather permanent locking is performed on the basis of the non-circular profile of the tube, in particular a profile with edges, where in place of a tube a solid body could be used and is specifically included in the scope of this invention. In this way the tube can be equipped with three, four, five, six, seven, eight or more edges. A tube with, for example, a cross-shaped profile or the like could also be selected, the important point being that the outer profile is non-circular. The drivers can be configured individually and combined into a ring or manufactured as a ring that is then slid axially onto the tube. Here it is sufficient that the drivers or the ring have only point contact with the circumference of the tube as long as a retention is attained, that is not subject to rotation. While in the simplest case the drivers are configured as fingers, teeth or the like, they can also be used as fixed knives, such as, for example, that of a straw chopper.

Large cost reductions are attained if the number of drivers around the tube per row are combined into a one-piece ring, for example, stamped from a steel plate, machined or flame cut. Particularly with stamping, high strength and short manufacturing time can be attained. With cutting or flame cutting, particularly using laser technology very close tolerances can be attained, that can result in retention of the rings on the tube practically without any play.

While the drivers can be provided with attached driver elements configured as tines, teeth or the like, a simple manufacture is nevertheless possible if the ring or the components of an assembled ring are configured as a multiple-sided polygon whose corners or points form each of the particular driver elements.

If the contact surfaces of drivers following each other are offset to different degrees relative to the driver elements, then the points, that is, the driver elements of the applied drivers, follow a helical shape so that load spikes are avoided. All drivers applied to a tube are brought together as a set and marked, if necessary, so that the drivers applied to the tube extend, for example, in a helical pattern.

An alternative configuration to the offset contact surfaces lies in the arrangement in which the contact surfaces of the drivers and of the tube are in an even-numbered relationship to each other. In this way a large number of identical drivers can be manufactured but applied to the tube in differing positions. Thereby not only a helical pattern is possible, but any number of other possible distributions can be selected.

While the drivers could be provided with shoulders or the like, in order to provide a space for strippers located opposite the rotor to slide through; a simpler approach would be to provide loose spacers that are inserted between the drivers and secured by them or retained by the tube. For example, the sides of the drivers facing each other could contain openings into which pins with heads are inserted. Or shells or the like could be welded or applied to the tube with adhesive.

Spacers with a rounded outer contour have the advantage that the crop being conveyed can slide along or over these components. The configuration as a ring makes it possible to slide them onto the tube, if necessary together with the drivers arranged as rings and to bring them into contact with each other.

A further possibility in the distribution of the drivers along the length or around the circumference consists in a variation of the number of spacers.

The drivers and, if necessary, the spacers can be fastened to the tube in a simple manner by providing a retaining plate in at least one end region of the rotor that is clamped by means of screws or the like. Two retaining plates could also be used, that is, at each end region, that are clamped by means of tensioning bolts.

Manufacturing costs can be reduced in an exemplary manner by providing in one or both end plates bearing journals configured as stub shafts for the support of the rotor in bearings in a frame or the like.

As an alternative to stub shafts, a shaft could be selected that extends through the tube and the retaining plates and fastens the entire assembly together, for example, by means of tensioning nuts or a tensioning nut and a shoulder.

BRIEF DESCRIPTION OF THE DRAWINGS

The drawing shows an embodiment of the invention that shall be described in greater detail in the following.

DESCRIPTION OF THE PREFERRED EMBODIMENT

Figure 1:
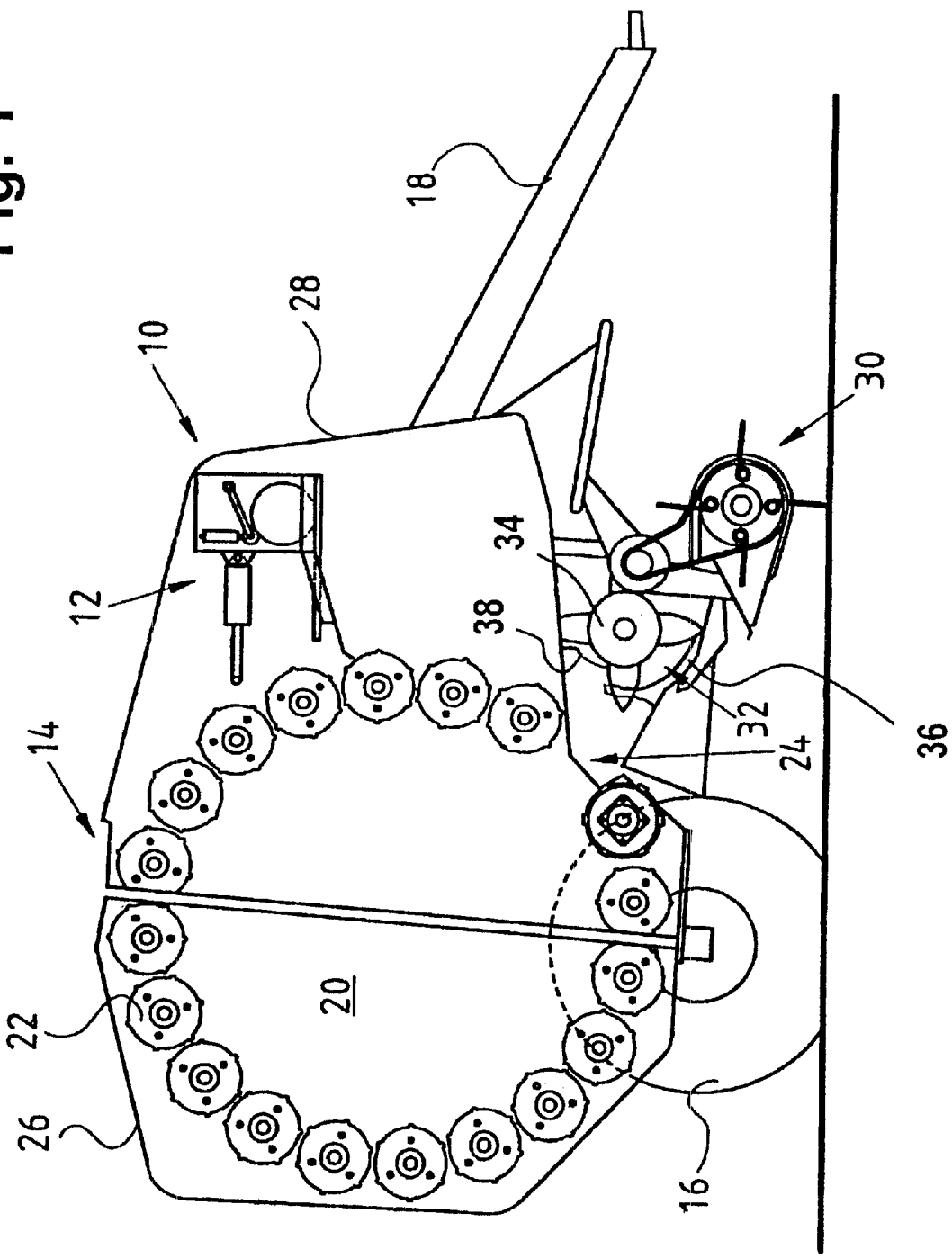
FIG. 1 is a schematic, right side view of an agricultural machine with a crop reducing arrangement.

An agricultural machine 10, shown in FIG. 1, is configured as a large round baler, which is, however, intended only as an example. Rather, instead other types of agricultural machines could be included, such as a self-loading forage box, another type of baler, cutting arrangements of a combine, for example, a straw chopper or machines of this type, in which crop is reduced.

The machine 10 shown, known for its type, contains a binding arrangement 12, a frame 14, wheels 16, a draft tongue or towbar 18, a baling chamber 20, rolls 22, a crop inlet 24, a pivoted housing part 26, a fixed housing part 28, a pick-up 30, and a reducing or separating arrangement 32, all of which are known in themselves and do not require any more detailed description.

The separating arrangement 32 is provided with a rotor 34, knives 36, and strippers 38, as are also known in themselves. Since the invention concerns the rotor 34, reference here is made to FIGS. 2 through 4.

Figure 2:
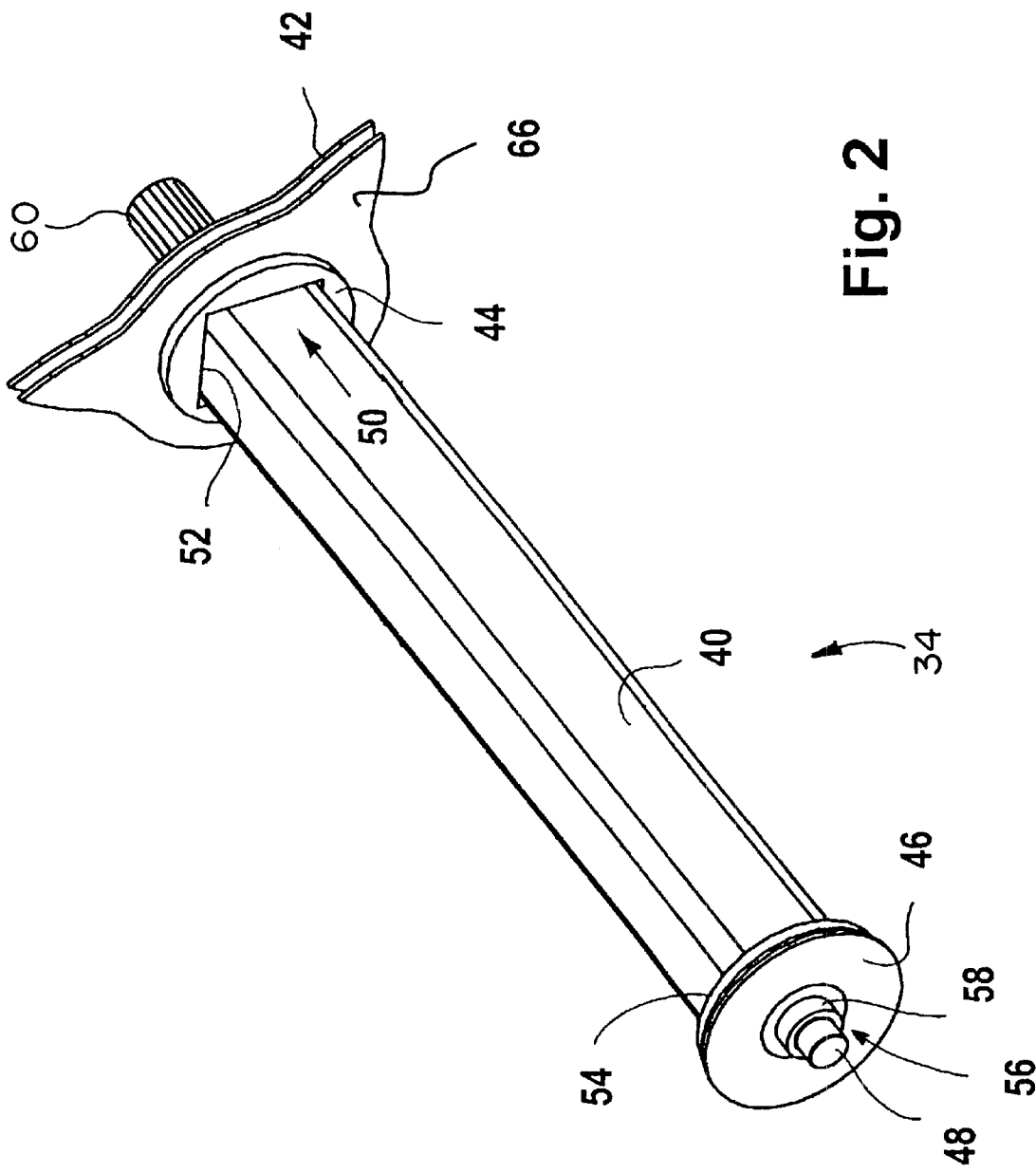
FIG. 2 is a perspective view of a part of a rotor.

In FIG. 2, parts of the rotor 34 can be recognized, particularly a tube 40, drivers 42, a spacer 44, a retaining plate 46, and a shaft 48.

In this embodiment, the tube 40 is configured with a square outer cross section with rounded corners. This is not mandatory; rather the outer cross section could have three, four, five, six, seven, eight, or more corners or be oval or cross-shaped. The rounded corners are useful for an assembly without jamming. The tube 40 of the separating arrangement 32, when used in a large round baler, is approximately as long as the width of the baling chamber 20. The tube 40 is made from a relatively heavy-walled steel and is drawn or welded.

In the present embodiment, the drivers 42 are each configured generally as a three-cornered uniform polygon that is stamped, machined or otherwise punched out of a plate as a ring. The driver elements 66 resulting from the corners of the polygon are relatively pointed, with pointed angles, so that the feet of the legs involved are not blended directly with each other. Rather, an arc-shaped region extends between them. The center of the driver 42 is provided with a square recess 50, which is provided with four contact surfaces 52 which are configured with a minimum of play to the outer circumferential surfaces of the tube 40. There should, however, be enough play that the drivers 42 can be slid onto the tube 40 without excessive effort. The illustration of FIG. 2 shows the recess 50 and the contact surfaces 52 of the driver 42 with reference to a spacer 44, since these are congruent in shape and size.

Each spacer 44 is also configured as a ring whose outer circumferential surface is cylindrical and whose center is also provided with a recess 50 and contact surfaces 52 of the same size and shape as those of the drivers 42. In the preferred embodiment, the diameter of the spacers 44 is selected in such a way that a clearance still exists to the radially innermost circumferential surface of the drivers. As can be seen from FIG. 4, the spacers 44 are somewhat thicker than the drivers 42. The spacers 44 may be made of metal (steel, aluminum) but also of plastic.

Figure 3:
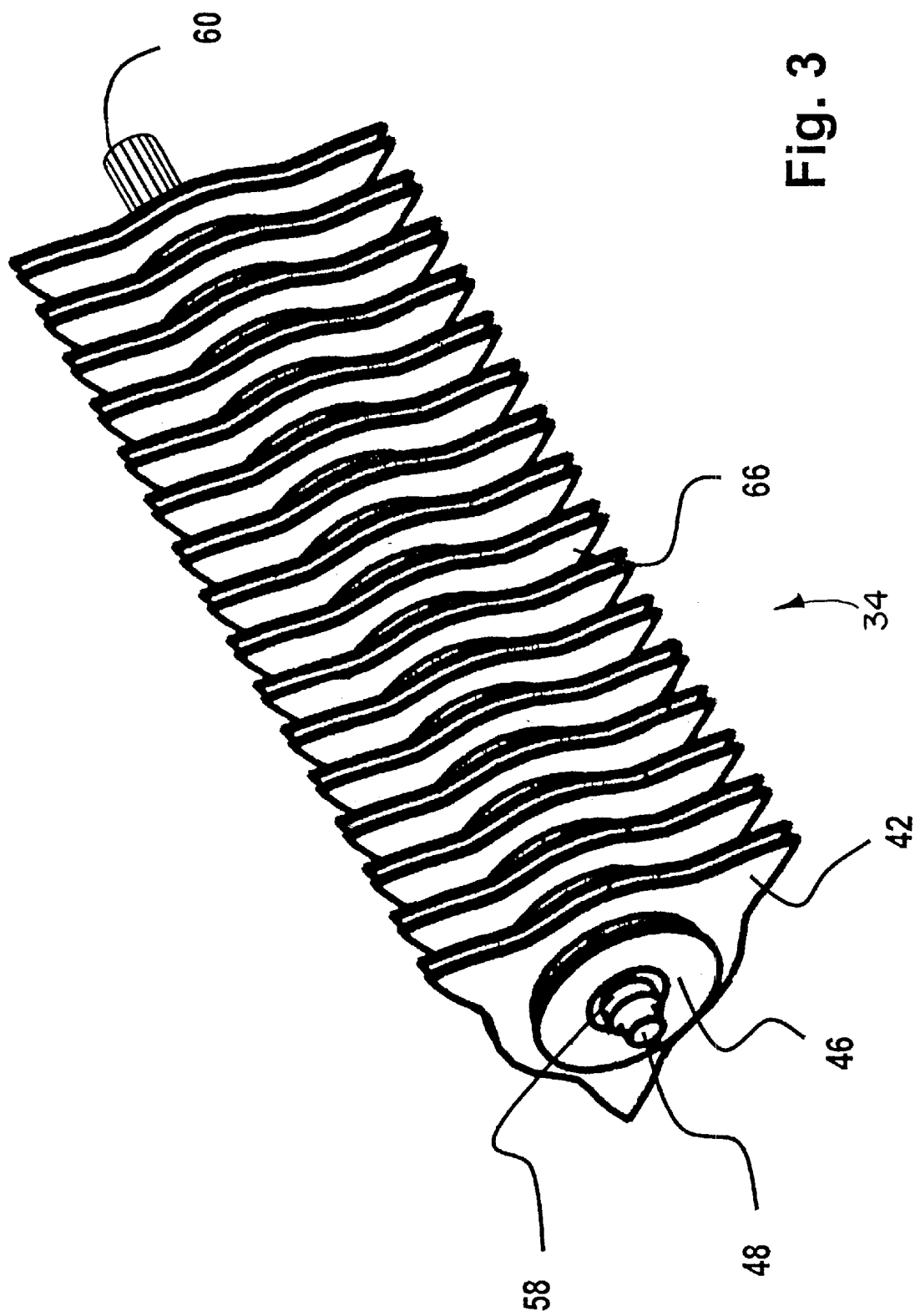
FIG. 3 is a perspective view of a complete rotor.
Figure 4:
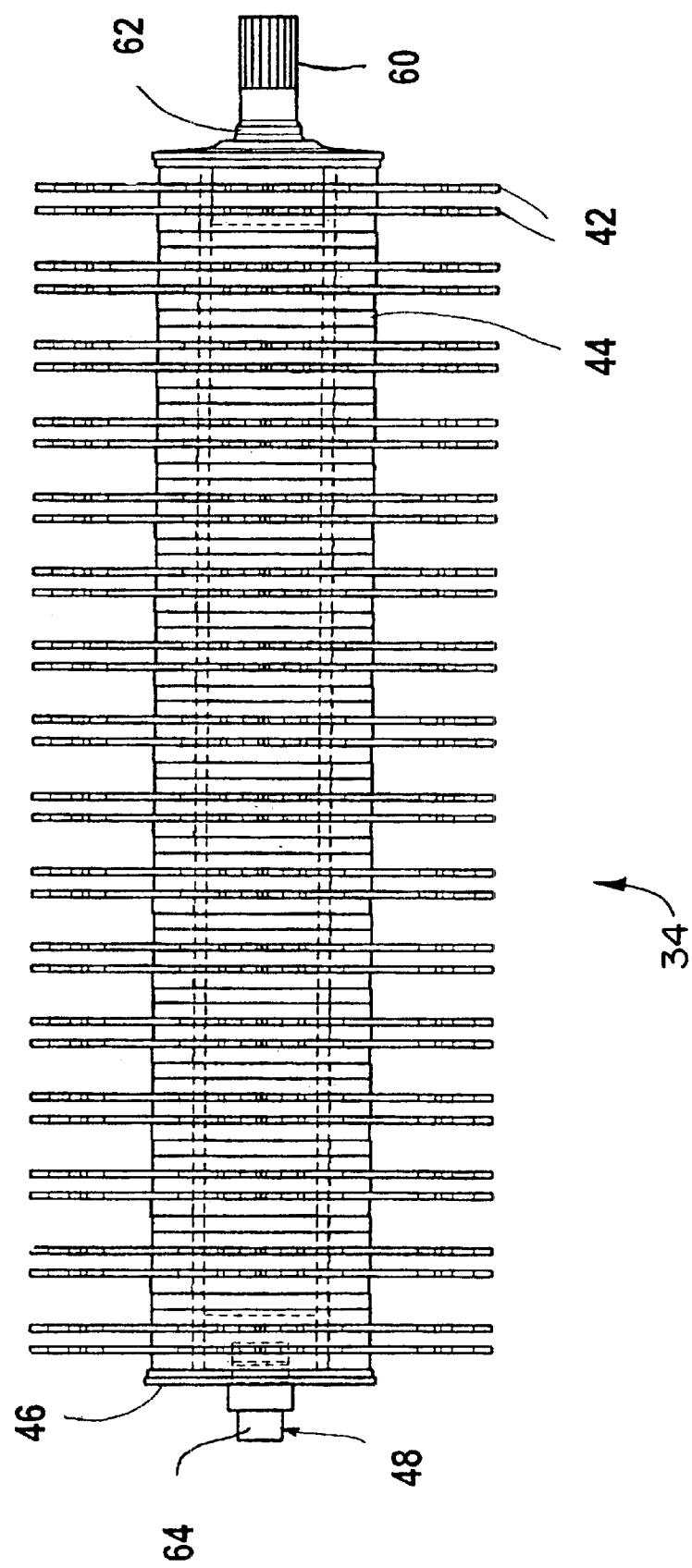
FIG. 4 is a front view of a complete rotor.

As can be seen from FIGS. 3 and 4, a multitude of spacers 44 and drivers 42 are distributed over the length of the tube 40. According to FIG. 4, three spacers 44 are located between each of two groups of drivers 42, while between the drivers 42 of a group one spacer 44 each is located. Furthermore, at each end there is an additional spacer 44. As an alternative, spacers 44 of differing widths could also be provided.

The retaining plates 46 are configured as circular cylinders and are provided with shoulders or grooves, not visible, by means of which they are centered on the ends of the tube 40. The retaining plates 46 are provided with contact surfaces 54 that press against the outer driver 42 or the outer spacer 44 in the assembled condition. Each of the retaining plates 46 is provided with a central hub 56, through which the shaft 48 extends. The outer diameter of the retaining plate 46 generally corresponds to that of a spacer 44.

The shaft 48 is longer than the tube 40 and extends beyond the tube on both sides. On the right side, as seen in the figures, the shaft 48 is provided with a multi-tooth profile 60 that engages a drive pulley or drive shaft and with a shoulder 62. The shoulder 62 is dimensioned in such a way that it can be brought into contact with the outer side of the right retaining plate 46. On the left side, as seen in the drawing, the shaft 48 ends in a bearing seat 64 that is followed on the inward side by a receptacle, not shown, for the tensioning nut 58 with which the left retaining plate 46 is pressed against the tube 40 or the last spacer 44 or the last driver 42. In an alternative embodiment, not shown, two stub shafts are provided in place of the shaft 48 and are fastened to the retaining plates 46, with the retaining plates 46 being drawn together by tensioning bolts or the like. Beyond that, further configurations are conceivable. For example, the retaining plates 46 could be bolted to the tube 40. It could also be possible to weld one or both retaining plates 46.

On the basis of the above description, the rotor 34 is completed in such a way that drivers 42 and spacers 44 are slid onto the tube 40 in a certain sequence, that the retaining plates 46 are brought into contact with the end faces of the tube 40 and the shaft 48 is slid through the hub 56 and is secured by the tensioning nut 58 or by the contact of the shoulder 62 on the right retaining plate 46. Depending on the position of the recess 50 relative to the corner regions of the drivers 42, the result is a straight-line, an offset or helical pattern of the driver elements 66 of the drivers 42.

In an alternative embodiment, not shown, the deviation from circularity of the tube 40 is attained by axial ribs, moldings or the like that are applied to a round tube by bolting, welding or riveting.

Having described the preferred embodiment, it will become apparent that various modifications can be made without departing from the scope of the invention as defined in the accompanying claims.

What is claimed is:

1. In a rotor including a plurality of individual drivers as components of a separating arrangement of an agricultural machine, the improvement comprising: said rotor including a center tube having a non-circular outer cross section disposed about a rotor axis; said drivers being provided with a central mounting opening in which said center tube is received and including at least a contact surface that follows the outer cross section of the tube at least partially about the periphery of the cross section; a shaft arrangement located along said axis and including first and second shaft ends respectively disposed at opposite ends of said center tube; first and second retaining plates being located at opposite ends of said center tube and mounted for movement together for sandwiching said plurality of individual drivers in place on said center tube.

2. The rotor, as defined in claim 1, wherein each driver is in the form of a one-piece ring.

3. The rotor, as defined in claim 1, wherein said drivers may be combined and are each provided with driver elements formed from the corners of a polygon.

4. The rotor, as defined in claim 3, wherein corresponding contact surfaces of drivers that follow one another axially along said tube are offset to differing degrees angularly about said tube resulting in said driver elements of one driver being offset angularly about said tube from the driver elements of a neighboring driver.

5. The rotor, as defined in claim 1, wherein each of said drivers and tube have a plurality of contact surfaces, with the number of contact surfaces of one being greater than the number of contact surfaces of the other and may be assembled such that less than all of the contact surfaces of that one of the drivers or tube with the greater number of contact surfaces is in contact with the contact surfaces of that one of the drivers or tube having the lesser number of contact surfaces.

6. The rotor, as defined in claim 1, and further including spacers mounted on said tube between said drivers.

7. The rotor, as defined in claim 6, wherein said spacers are each configured as a ring having a circular outer cross section.

8. The rotor, as defined in claim 6, wherein said drivers are arranged in axially spaced groups along said tube; and said spacers being located such that more spacers are located between said groups of drivers than between drivers within a group.

9. The rotor, as defined in claim 1, wherein said shaft arrangement is a single shaft extending completely through said center tube.

10. A rotor, as defined in claim 1, wherein said first and second shaft ends are respectively first and second stub shafts; and said first retaining plate being fixed to said first stub shaft and with said first retaining plate being adapted for being received in a bearing for supporting the rotor.

11. A rotor, as defined in claim 9, wherein said shaft has a shoulder in axial contact with said second retaining plate.

* * * * *